United States Patent [19]

Jordan

[11] Patent Number: 5,674,142
[45] Date of Patent: Oct. 7, 1997

[54] CONTROL CABLE ADJUSTMENT DEVICE

[75] Inventor: Brian T. Jordan, Chicago, Ill.

[73] Assignee: SRAM Corporation, Chicago, Ill.

[21] Appl. No.: 631,895

[22] Filed: Apr. 16, 1996

[51] Int. Cl.$^6$ ............................................. F16H 59/00
[52] U.S. Cl. .......................... 474/80; 74/502.4; 74/502.5
[58] Field of Search ............................. 474/80–82, 69, 474/113, 101; 74/502.4, 502.5

[56] References Cited

U.S. PATENT DOCUMENTS

| | | | |
|---|---|---|---|
| 3,546,962 | 12/1970 | Ruhala | 74/501 |
| 3,580,102 | 5/1971 | Wrabetz et al. | 74/501 |
| 4,198,873 | 4/1980 | Nagano | 74/217 B |
| 4,334,438 | 6/1982 | Mochida | 74/501 R |
| 4,543,849 | 10/1985 | Yamamoto et al. | 74/501.5 R |
| 4,721,495 | 1/1988 | Kan et al. | 474/135 |
| 4,833,937 | 5/1989 | Nagano | 74/50.15 R |
| 5,279,179 | 1/1994 | Yoshigai | 74/502.2 |
| 5,607,367 | 3/1997 | Patterson | 474/80 |

FOREIGN PATENT DOCUMENTS

WO 84/0119  3/1984  WIPO ............... F16D 13/75

Primary Examiner—Roger J. Schoeppel
Attorney, Agent, or Firm—Ralph C. Francis

[57] ABSTRACT

An improved two piece control cable adjustment device for offsetting a change of relative length between the outer sheath and control wire of a control cable operatively linking a control mechanism such as a bicycle shifter or brake lever to an operating mechanism such as a derailleur or brake. The adjustment device includes an adjuster nut having a threaded bore cooperating with a mounting member threaded shaft and an indexing mechanism achieved by the relative elastic deformation of rotatably engaging protrusions and/or detents circumferentially formed on the cooperating adjuster nut and mounting member thereby enabling riders to sense each increment of stepped adjustment. The adjuster nut is configured to protectively enclose both the cooperating threads and engaging portion of the protrusions and detents from environmental exposure thereby preventing the trapping of external particles in the threads, a primary concern for use in the harsh mud and dirt environment common to off-road biking, and in turn preventing the premature wear and replacement of parts.

31 Claims, 8 Drawing Sheets

$$T_1 = T_1' = \frac{M}{D_1}$$

$$T_2 = T_2' = \frac{M'}{D_2}$$

$$M = T_1 D_1 \qquad M' = T_2 D_2$$

$$M = M'$$

$$T_1 D_1 = T_2 D_2$$

$$T_2 = T_1 \left(\frac{D_1}{D_2}\right)$$

CONTROL CABLE ADJUSTMENT DEVICE

FIELD OF THE INVENTION

This invention relates in general to control cables, and more particularly to an adjustment device for Bowden type (cable within a housing) bicycle control cables.

BACKGROUND OF THE INVENTION

Conventionally, a bicycle control cable, comprising a control wire partially encased by a sheath, is interposed between an operating mechanism, such as a bicycle derailleur or brake, and a control device, such as a shifter or brake lever. In the case of a bicycle derailleur, the control wire links the shifter to a derailleur having a chain guide for switching a drive chain laterally between the sprockets of a multistage sprocket assembly. Derailleur shifters are generally available in two varieties; conventional pivoting levers and rotational twist-shifters. State of the art twist-shifters as described in Patterson (U.S. Pat. No. 4,900,291), are manufactured by SRAM Corporation of Chicago, Ill. and marketed under the "Grip Shift®" mark.

Conventional derailleur shifters are manually actuated to laterally displace the chain guide and in turn the drive chain to the desired sprocket. With conventional friction shifters, shifts between sprockets are generally characterized by "rasping" noises as the chain is temporarily seated in the region between sprockets thereby requiring the rider to exercise skill in actuating the shifter. Index shifting mechanisms have greatly simplified the shifting process by enabling precise indexed shifts between sprockets thereby minimizing the rasping noises. In both friction and index shifters, however, repeated shifting tends to both compress the cable sheath and stretch out the control wire, resulting in a change in relative length or slack between the control wire and the cable sheath. This slack in the control cable may cause the chain guide to urge the drive chain into the "rasping" zone or may even result in undesired shifts.

Similarly, slack in brake control cables widens the gap between the brake shoes and the wheel rim thereby requiring greater brake lever deflection to initiate braking and will generally alter the brake "feel." This may result in a potentially hazardous situation whereby a rider accustomed to brake shoe contact after deflecting the brake lever a given distance may overcompensate and unintentionally lock the brakes inducing a skid. It is therefore desirable to incorporate an adjustment device into control cable systems to eliminate any excessive cable slack.

Generally, control cable adjustment devices, such as that illustrated in FIG. 1, include a threaded adjuster screw 2 that engages a mounting member 4 having an internal threaded portion 6. The control wire 8 is fed through the adjuster screw cable guide 10 and the mounting member cable guide 6, while the sheath 12 bears against the adjuster screw 2. Rotation of the adjuster screw axially displaces the adjuster screw 2 and, in turn, the cable sheath 12 relative to the mounting member 4 enabling adjustment of the control cable displacement.

As illustrated in FIG. 1, conventional friction type control cable adjustment devices require the use of an additional part, namely a locking nut 14, to prevent unwanted vibration or control cable induced rotation of the adjuster screw 2. Additionally, such adjustment devices lack an indexing mechanism that would enable precise stepped adjustment of the control cable displacement as well as permit the rider to sense each stepped increment of adjustment.

Several conventional adjustment devices do, however, include an indexing device. Illustrative is the adjustment device disclosed in U.S. Pat. No. 4,833,937, which is incorporated by reference herein. In the noted reference, an axial indexing mechanism is disclosed wherein the cooperating indexing surfaces are positioned in line with the adjuster screw. Such devices, besides requiring the use of additional parts that incorporate the indexing surfaces, are nonfunctional without the use of an additional spring element required to bias the indexing surfaces against each other.

Most significantly, existing control cable adjustment devices uniformly employ a threaded shaft on the adjuster element instead of on the mounting member. Such a configuration has several significant disadvantages. For example, the use of an adjuster screw exposes the threads and spring to the environment, permitting mud and dirt to collect in the threads and spring coils thereby hampering or altogether preventing adjustments under field conditions. This becomes a significant problem when used on mountain bikes which are specifically designed for use in harsh off-road environments. Additionally, forced adjustment of a partially or fully jammed adjuster screw may result in the premature wear of the threaded surfaces on the adjuster screw and more significantly on the mounting member itself, unnecessarily prompting the premature and costly replacement of parts.

A further disadvantage of incorporating a shaft on the adjuster element is the significantly higher thread loads inherent to an adjuster screw design as compared to an adjuster nut configuration. The adjuster element generally incorporates a socket which seats the cable sheath thereby subjecting the adjuster to repeated, cable induced out-of-plane moment or "prying loads" during use. Additionally, significant out-of-plane moment loading results from direct impact loading of the adjuster, frequently occurring during off-road use.

The reduced thread loading inherent to an adjuster nut design is illustrated in FIG. 2 where an adjuster screw 96 and an adjuster nut 98 are shown threaded into a mounting member 97. The out-of-plane moment or prying load M, acting on the adjuster screw 96, is balanced by an equal and opposite moment load M', acting on the adjuster nut 98. As shown, the assembly, comprising the adjuster screw 96, the mounting member 97 and the adjuster nut 98 is in moment equilibrium, whereby the moments M, M' are transmitted to the mounting member 97 through the mounting member internal and external threads 95a, 95b receiving the adjuster screw 96 and adjuster nut 98, respectively.

Referring to FIG. 3, there is shown an exploded view of the above noted assembly 96, 97, 98, illustrating the loads acting on each individual element 96, 97, 98. As shown, the adjuster screw 96, adjuster nut 98 and mounting member 97 are in loading equilibrium. The moment M applied to the adjuster screw 96 is balanced by equal and opposite thread forces $T_1$, $T_1'$ which act primarily on the outermost threads at a thread diameter $D_1$, resulting in thread loads of magnitude $T_1 = T_1' = M/D_1$. Likewise, the adjuster nut moment M' is balanced by equal and opposite thread forces $T_2 = T_2' = M'/D_2$ acting at a thread diameter $D_2$. The thread forces $T_1$, $T_1'$ and $T_2$, $T_2'$, in turn, act on the internal and external threads 95a, 95b of the mounting element 97, respectively, placing it in loading equilibrium as well.

The magnitude of the thread loads $T_1$, $T_2$ is directly proportional to the thread diameters $D_1$, $D_2$. An adjuster nut configuration, however, couples out the same moment load M' over the larger thread diameter $D_2$. In fact, for any given mounting element configuration, switching from an internal thread design (i.e. adjuster screw) to an external thread design (i.e. adjuster nut), proportionally reduces the thread loads by the thread diameter ratio $D_1/D_2$ (i.e. $T2=T1\times D1/D2$). These reduced thread loads are especially significant in light of the increasing emphasis in the bicycle industry to provide lighter weight components formed from thermoplastic, resin-based and other non-metallic materials. Because of the use of these lighter weight and reduced strength materials, there is a strong need to develop designs with reduced thread loading.

The substantially reduced thread loads in combination with the protective sealing benefits inherent in an adjuster nut configuration, prevents premature wear of the threads and in turn the premature and costly replacement of parts. The adjustment device of the present invention avoids the limitations inherent to adjuster screw designs and overcomes other problems existing in conventional control cable adjustment devices.

It is therefore an object of the present invention to provide a control cable adjustment device that is especially well suited for off-road use in mud and dirt environments, that substantially encases the cooperating threads and engaging portion of the protrusions and detents thereby preventing premature wear of the cooperating surfaces.

Another object of the present invention is to provide an adjustment device that significantly reduces the thread loads resulting from external moment or prying loads that are common to off-road biking.

A further object of the present invention is to provide an economical two piece adjustment device that embodies a simple rotational indexing mechanism based on the relative elastic deformation of the engaging surfaces thereby enabling the rider to sense each stepped increment of adjustment without the use of extraneous spring elements or additional cooperating parts.

SUMMARY OF THE INVENTION

In accordance with the objects and advantages of the present invention, the control cable adjustment device of the present invention comprises an elongated mounting member having an outer surface and a first cable lumen adapted to receive the control wire therethrough, and an adjuster having a bore defining an inner surface. The adjuster is adapted to rotationally mount the mounting member whereby the adjuster is axially movable relative to the mounting member in response to rotation of the adjuster. The adjuster includes a second cable lumen adapted to receive a control wire therethrough and a sheath seat adapted to position one end of a cable sheath.

The adjustment device of the invention further includes an indexing mechanism comprising a system of cooperating detents and protrusions. The protrusions are adapted to elastically engage and disengage the detents in response to rotation of the adjuster, thereby enabling stepped adjustment of the control cable displacement.

BRIEF DESCRIPTION OF THE DRAWINGS

The foregoing objectives, advantages and features of the invention and those which will be apparent below can be better appreciated after review of the following detailed descriptions, taken in conjunction with the accompanying drawings, in which like parts are given like reference numerals and wherein.

DETAILED DESCRIPTION OF THE PREFERRED EMBODIMENT

Figure 4:
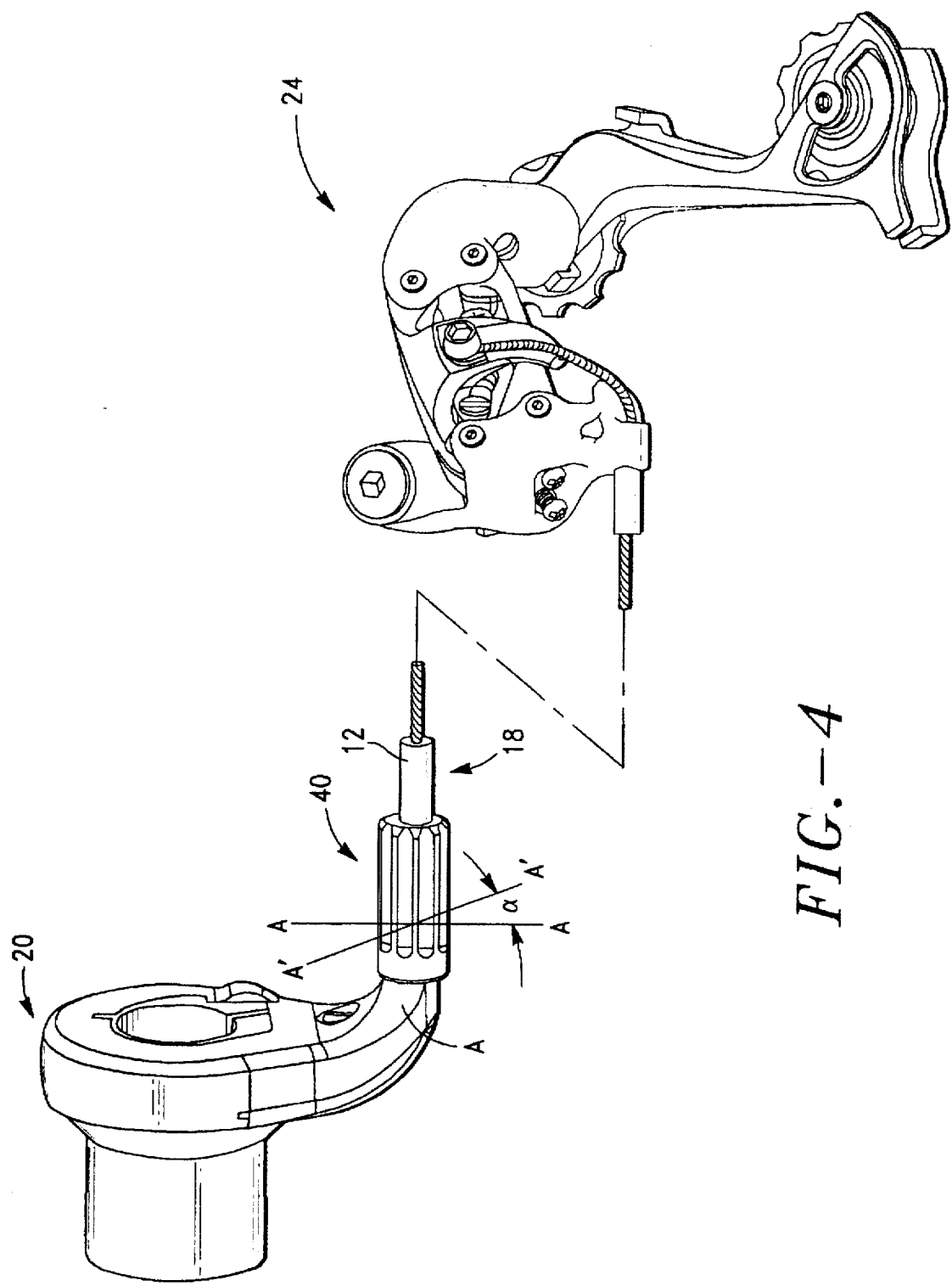
FIG. 4 is an isometric view of an embodiment of the invention in combination with a shifter mechanism linked to a derailleur mechanism.

FIG. 4 illustrates a typical embodiment of the invention shown in combination with a bicycle twist-shifter 20 linked to a derailleur 24. A bicycle control cable 18 comprising an outer sheath 12 encasing a control wire 8, operatively links the shifter 20 to the derailleur 24. The control wire 8, which preferably is a multi-filament alloy or steel cable, is of the Bowden type.

Figure 5:
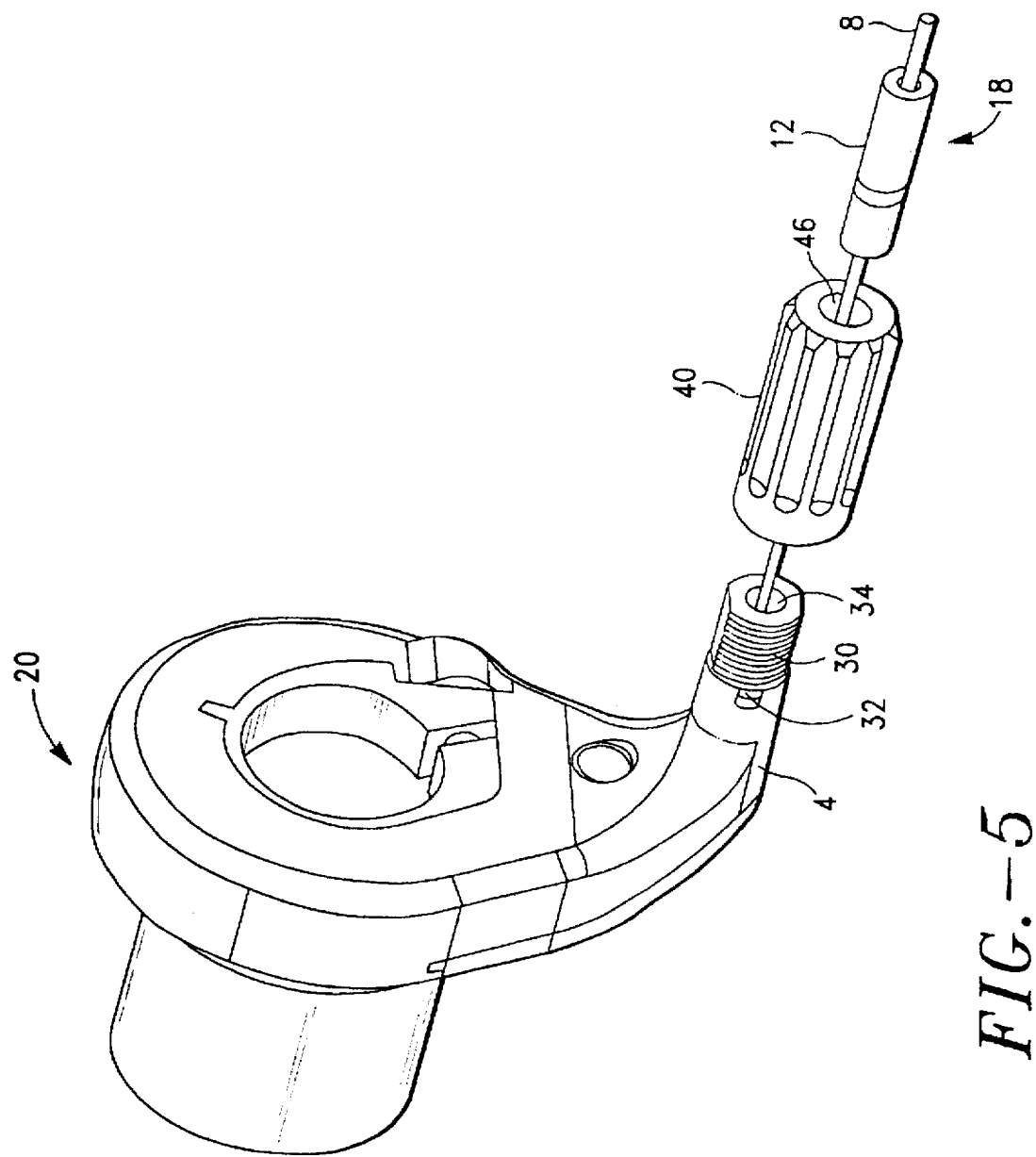
FIG. 5 is an expanded isometric view of the cooperating elements of the adjustment device of the invention in a shifter embodiment.

FIG. 5 illustrates the cooperating elements of the adjustment device of the present invention in a shifter embodiment. Shifter 20 includes a mounting member 4 having a threaded shaft 30, a plurality of protrusions 32 formed circumferentially on the mounting member outer surface and an insertion bore 34 for receiving the control wire 8.

Figure 7:
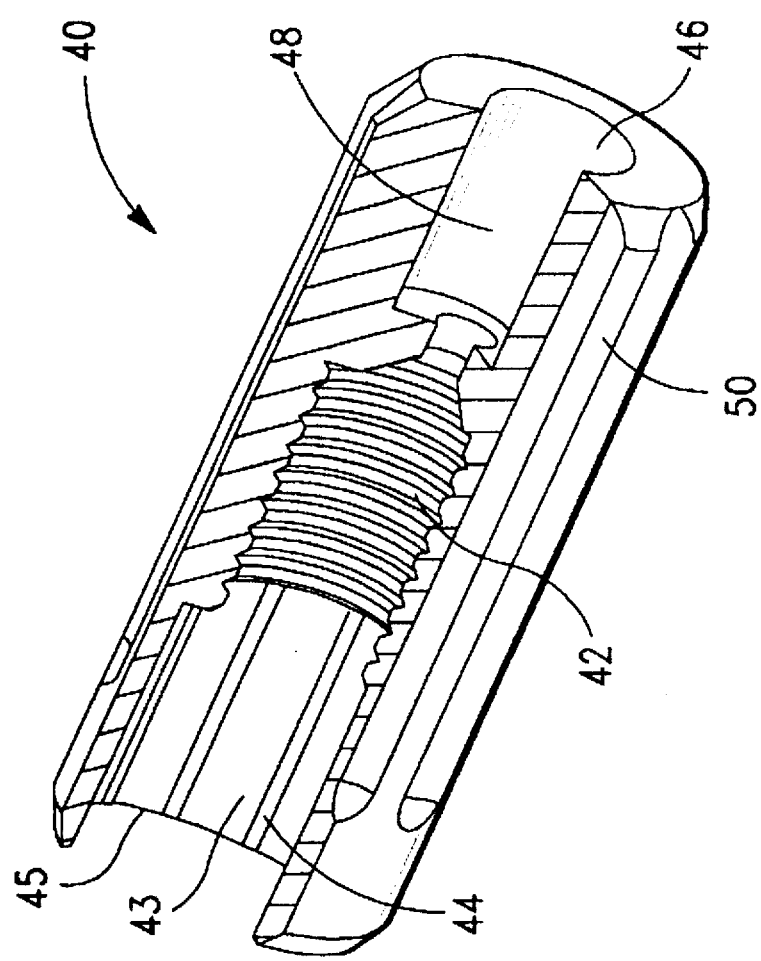
FIG. 7 is an isometric cutaway view of an adjuster nut embodiment of the present invention.

FIG. 7 is an isometric cutaway view of the adjuster nut of the invention. The adjuster nut 40 includes a threaded bore 42 that cooperates with the threaded shaft 30 of the mounting member 4, a plurality protrusions 44 formed on the adjuster nut inner surface 43 that rotatably engage and disengage the mounting member protrusions 32 and an insertion bore 46 for receiving the control wire 8. In a preferred embodiment, the adjuster nut protrusions 44 comprise longitudinal ribs extending from the adjuster nut outer end 45 to the threaded bore 42. The adjuster nut 40 and mounting member 4 are preferably formed from thermoplastic material.

In another preferred embodiment, the adjuster nut 40 includes a socket 48 which seats the cable sheath 12 (See FIG. 4) and a ribbed outer surface 50 to enhance grip when rotating the adjuster nut 40. The adjustment device, which in FIG. 4 is shown attached to the shifter 20 (i.e., operating mechanism), may in additional embodiments not shown be incorporated on the bicycle derailleur or operating device.

As illustrated in FIGS. 4 and 5, the control wire 8, which is fed through the insertion bores 46, 34 of the adjuster nut 40 and the mounting member 4, is operatively connected at one end to the derailleur 24 and at its other end to the shifter 20. The sheath 12, which is seated in the adjuster nut socket 48 at one end, is fixed to the bicycle frame at its other end (not shown).

In operation, repeated derailleur shifts compress the sheath 12 and stretch the control wire 8. This relative change in length or "slack" between the control sheath 12 and the control wire 8 is offset by manual rotation of the adjuster nut 40 which axially displaces both the adjuster nut 40 and the sheath 12 relative to the mounting member 4 thereby removing the slack in the control cable 18. According to the invention, rotation of the adjuster nut 40 causes the mounting member protrusions 32 to engage and disengage, through relative elastic deformation, the adjuster nut protrusions 44 thereby enabling the rider to sense each stepped or indexed increment of adjustment. The adjuster nut 40 is also designed and configured to substantially enclose both the cooperating threaded surfaces 30, 42 as well as the engaging portion of the protrusions 32, 44 over the entire range of motion of the adjuster nut 40 along the mounting member 4, thereby protecting the cooperating surfaces from external particles which may become trapped between the threaded surfaces.

In additional embodiments, a bellows sealably connecting the adjuster outer surface 41 and mounting member outer surface 5, may be used to protectively encase the cooperating threads and engaging protrusions and detents. Protection of the cooperating surfaces is of paramount concern in off-road biking environments where exposed threads tend to trap mud and dirt particles which are then ground between the cooperating threaded surfaces as control cable adjustments are made under field conditions thereby leading to the premature wear and replacement of parts.

Figure 6:
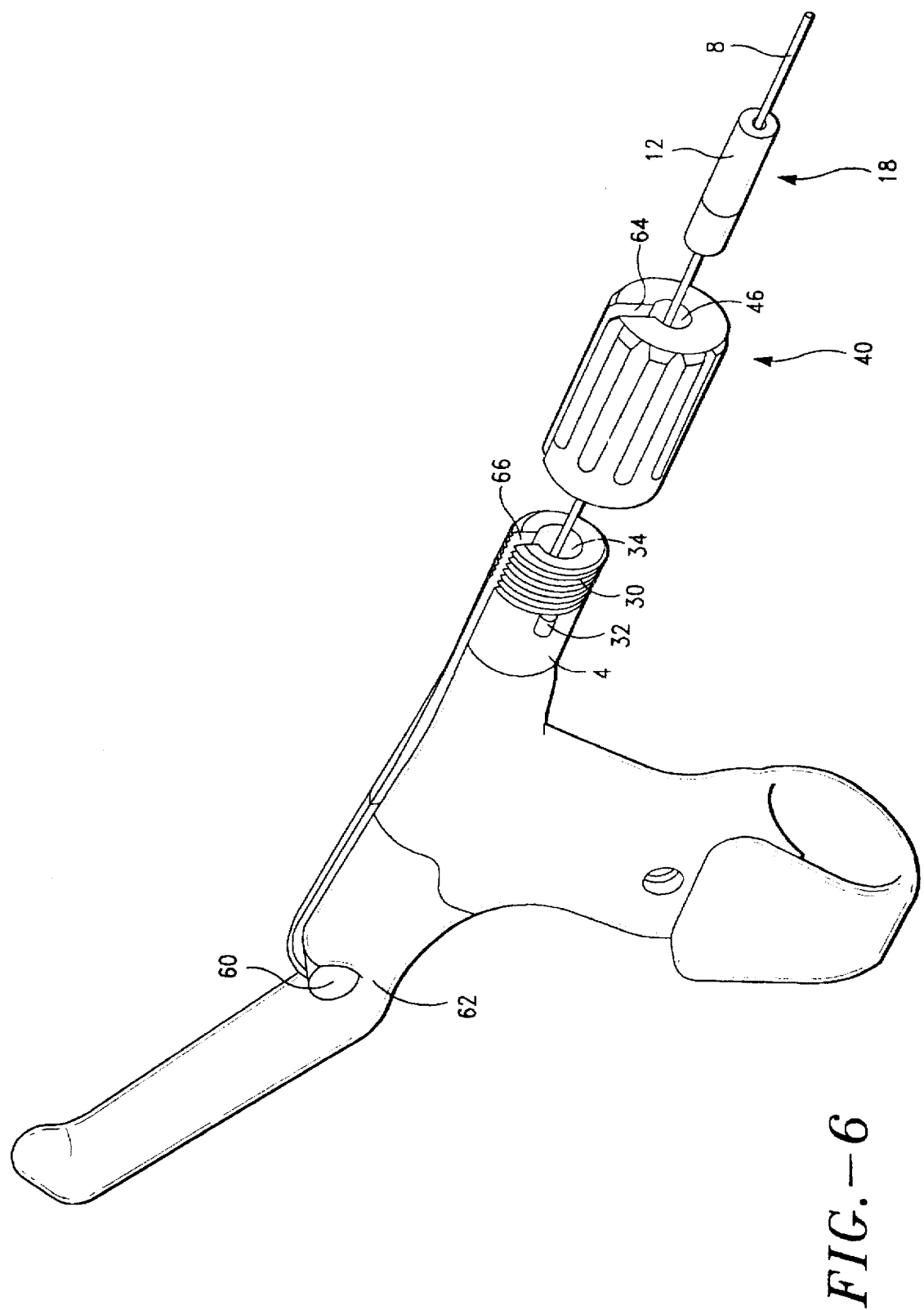
FIG. 6 is an expanded isometric view of the cooperating elements of the adjustment device of the invention in a brake lever embodiment.

FIG. 6 illustrates the adjustment device of the invention in a brake lever embodiment. A brake lever mechanism is characterized by the use of a cable end 60 disposed on the end of the control wire 8, the cable end 60 being operatively connected to the pivoting lever 62. To facilitate the installation of a control wire 8 having a cable end 60, slots 64, 66 are formed in the adjuster nut 40 and the mounting member 4. The presence of the slot 64 along the length of adjuster nut 40 reduces the radial and bending stiffness of the adjuster nut wall. This, in turn, reduces the rotational resistance of the indexing mechanism thereby requiring the use of a thicker adjuster nut wall or stiffer material.

Figure 8B:
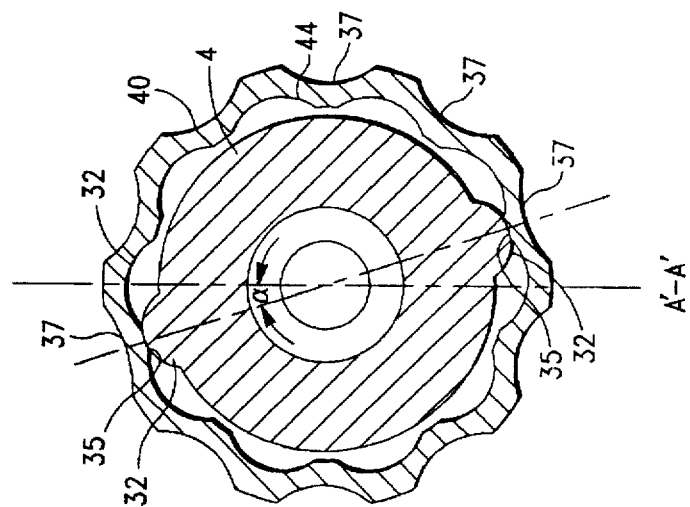
FIG. 8a and 8b are sectional views of the adjuster nut and mounting member embodiment shown in FIG. 8 taken on line A'—A' of FIG. 4, illustrating the deformation characteristics and mechanisms according to the invention.
Figure 8A:
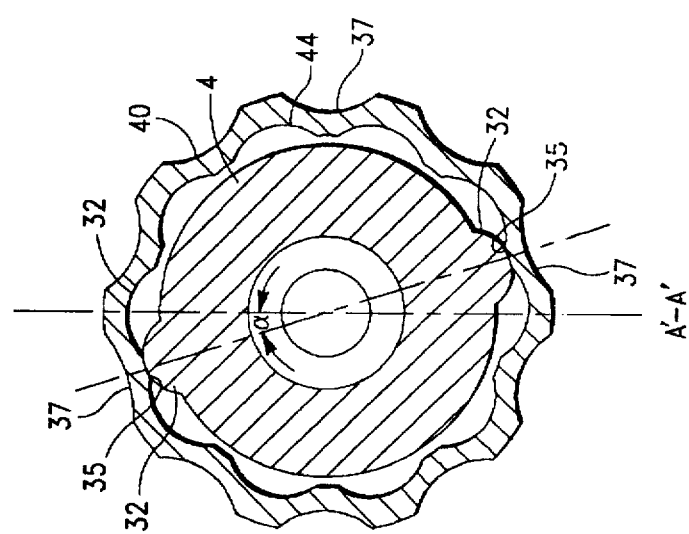
Figure 8:
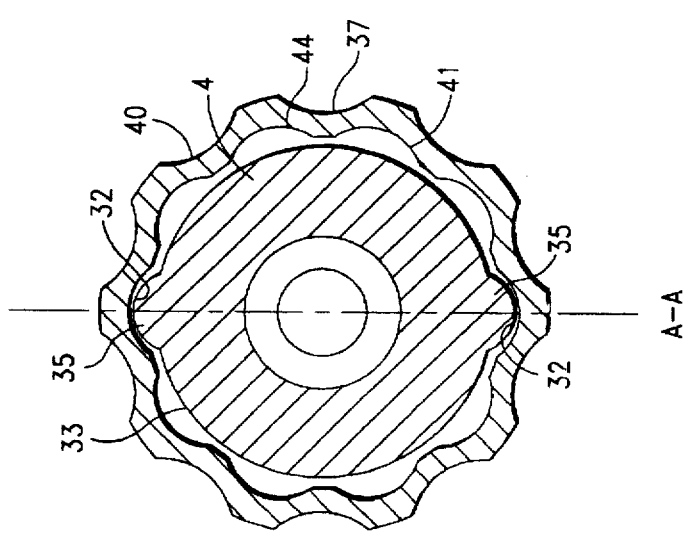
FIG. 8 is a sectional view of an adjuster nut and mounting member embodiment of the present invention taken on line A—A of FIG. 4.

As illustrated in FIG. 8, the mounting member 4 of the invention includes a plurality of protrusions 32 disposed on the outer surface 33 thereof. According to the invention, the mounting member protrusions 32 define a plurality of first deformable regions 35.

As will be appreciated by one having skill in the art, one or more mounting member protrusions 32 may be employed within the scope of the invention. However, in a preferred embodiment, two protrusions 32 are disposed on the mounting member outer surface 33.

The adjuster nut 40 includes an indexing portion 41 comprising a plurality of engaging detents 44 adapted to engage the mounting member protrusions 32 and a plurality of second deformable regions 37 disposed between the engaging detents 44. In operation, the engagement of the protrusions 32 and detents 44 maintains the adjuster nut 40 position on the mounting member 4.

As illustrated in FIG. 8a, according to the invention, when the adjuster nut 40 is rotated a given angle γ relative to the mounting member 4, the mounting member protrusions 32 and the adjuster stop detents 44 disengage, the first and second deformable regions 35, 37 slidably cooperate, and the first deformable region 35 exhibits a first deformation while the second deformable region 37 exhibits a second deformation.

Applicant has found that optimum performance of the control cable adjustment device is achieved when the second deformation (i.e. adjuster nut) is greater than the first deformation, such as that illustrated in FIG. 8a. Accordingly, in a preferred embodiment the Modulus of Elasticity for the first and second deformable region is in the range of approximately 200,000 psi to 30,000,000 psi, more preferably in the of approximately 300,000 psi to 1,000,000 psi.

According to the noted preferred embodiment of the invention, when the adjuster nut 40 is rotated and the protrusions 32 transition between respective engaging detents 44, the shape of the nut 40 undergoes a slight transition from (i) a substantially circular shape, to (ii) an oval shape, and returns to (iii) a substantially circular shape. The relative shape of the adjuster nut 40 through the noted transition will of course depend on the Modulus of Elasticity of the first and second deformable regions.

As will be appreciated by one having skill in the art, the first and second deformable regions may be designed and configured to achieve optimum first and second deformations, resistance forces (as discussed below) and, hence, "user feel". For example, in additional embodiments of the invention, as illustrated in FIG. 8b, the first and second deformations are substantially equal. In additional embodiments, not shown, the first deformation is greater than the second deformation.

In additional embodiments of the invention, not shown, the adjuster nut 40 may include a plurality protrusions and the mounting member may include a plurality of engaging detents adapted to engage the adjuster nut protrusions. In operation, such a configuration may be adapted to exhibit similar deformation characteristics as that detailed above.

Figure 9:
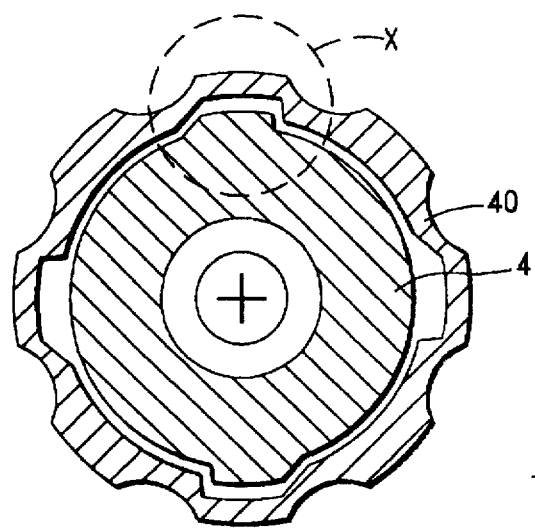
FIG. 9 is a sectional view of an additional adjuster nut and mounting member embodiment of the present invention taken on line A—A of FIG. 4.
Figure 10:
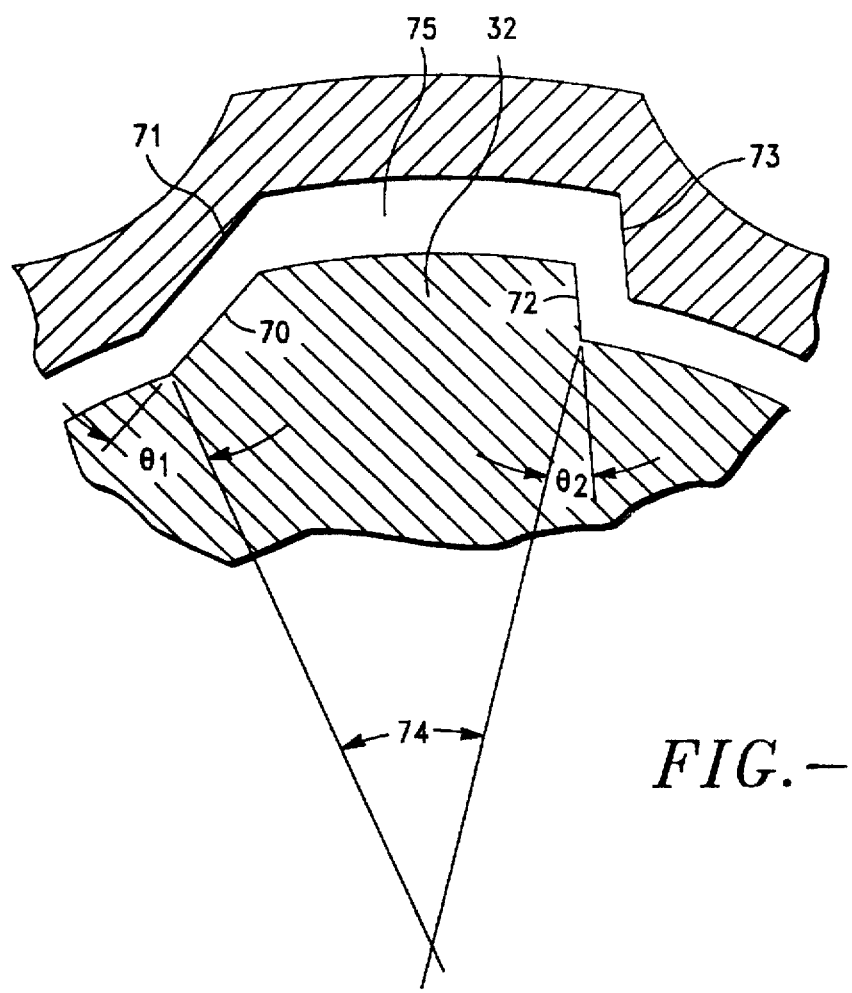
FIG. 10 is a plan view of detail X of FIG. 9.

FIG. 9 is a sectional view taken on line A—A of FIG. 4 showing an additional preferred adjustment device embodiment exhibiting differing rotational resistances for each direction of rotation. Upon installation of the adjustment device in a control cable system, slack in the control cable is removed by rotation of the adjuster nut 40 such that the adjuster nut 40 is displaced away from the mounting member 4. Therefore, in an additional embodiment the rotational indexing resistance displacing the adjuster nut 40 axially away from the mounting member 4 may be reduced relative to the rotational indexing resistance in the opposite direction. This differing rotational resistance may be achieved, as shown in FIG. 10, by using protrusions 32 having sloping surfaces 70, 72 with correspondingly distinct angles $\theta_1$, $\theta_2$ with respect to radial lines 74. As the sloping surfaces 70, 72 engage their respective cooperating surfaces 71, 73, which partially define the detent 75, differing rotational indexing resistances result in response to rotation of the adjuster nut 40 in the clockwise versus counterclockwise directions.

The adjuster nut 40 elastic resistance to the combined radial and bending deformation induced by the indexing engagements is greatest at the center of the adjuster nut and decreases towards the adjuster nut outer end 45. This increasing flexibility towards the adjuster nut outer end 45 results in a correspondingly decreasing resistance to rotation as the nut is displaced axially away from the mounting member. The varying rotational resistance for rotation in a given direction may be offset by correspondingly varying the slope of the cooperating surfaces 70, 71 and 72, 73 along the length of the engaging protrusions 32 and detents 75.

Such a change will offset the reducing adjuster nut radial and bending stiffness with a correspondingly increasing engagement resistance achieved by increasing the slope of the cooperating indexing surfaces 70, 71 and 72, 73. In the embodiment of FIG. 10, this counterbalancing effect can be achieved by defining angles $\theta_1$, $\theta_2$ at their maximum values at the end of the protrusions 32 and detents 75 closest to the center of the adjuster nut and correspondingly reducing angles $\theta_1$, $\theta_2$ (i.e. increasing slope) towards the adjuster nut outer end 45.

In yet another embodiment, the adjuster nut 40 may cooperate with the mounting member 4 without the use of cooperating threads 30, 42. Additional embodiments may incorporate a stepped pattern of incremental axial and rotational displacements between the adjuster nut 40 and the mounting member 4 (not shown), thereby achieving a similar cooperating relationship between the adjuster nut 40 and the mounting member 4.

Accordingly, it will be appreciated by a person having ordinary skill in the art that the adjustment device of this invention embodies a simple and economical two piece device for offsetting slack in a control cable that substantially encases and protects the engaging surfaces from environmental exposure while significantly reducing the thread loading resulting from external out-of-plane moment loads. In addition, the adjustment device efficiently incorporates within its two piece configuration a simple rotational indexing mechanism based on the relative elastic deformation of the engaging surfaces that effectively enables the rider to sense each stepped increment of adjustment without resorting to a spring biased design.

Although the invention has been described with reference to several different embodiments, these embodiments are merely exemplary and not limiting of the invention which is defined by the appended claims.

What is claimed is:

1. In a control cable system having a control wire operatively connected to a control mechanism and an operating mechanism, said control cable including a cable sheath encasing a portion of said control wire, said adjustment device comprising:

an elongated mounting member having an outer surface, said mounting member including a first cable lumen adapted to receive the control wire therethrough, said outer surface including a plurality of protrusions, said protrusions defining a plurality of first deformable regions; and an adjuster rotatably mounted on said mounting member such that said adjuster is axially movable relative to said mounting member in response to rotation of said adjuster, said adjuster including a second cable lumen adapted to receive the control wire therethrough, a sheath seat adapted to position one end of the cable sheath, and an indexing portion, said adjuster indexing portion including a plurality of detents adapted to engage said mounting member protrusions and a plurality of second deformable regions disposed between said engaging detents, whereby when said adjuster is rotated a given angle relative to said mounting member (i) said mounting member protrusions and said adjuster engaging detents disengage, (ii) said first and said second deformable regions slidably cooperate, and (iii) said first deformable region exhibits a first deformation and said second deformable region exhibits a second deformation.

2. A control cable adjustment device according to claim 1, wherein said second deformation is greater than said first deformation.

3. A control cable adjustment device according to claim 1, wherein said first deformation and said second deformation are substantially equal.

4. A control cable adjustment device according to claim 1, wherein said first deformation is greater than said second deformation.

5. A control cable adjustment device according to claim 1, wherein said adjuster indexing portion includes a plurality of protrusions and said mounting member outer surface includes a plurality of engaging detents adapted to engage said adjuster protrusions, said adjuster indexing portion protrusions defining a plurality of first deformable regions.

6. A control cable adjustment device according to claim 5, wherein said mounting member outer surface includes a plurality of second deformable regions disposed between said engaging detents.

7. A control cable adjustment device according to claim 6, wherein said first deformation is greater than said second deformation.

8. A control cable adjustment device according to claim 6, wherein said first deformation and said second deformation are substantially equal.

9. A control cable adjustment device according to claim 6, wherein said second deformation is greater than said first deformation.

10. A control cable adjustment device according to claim 1, wherein the Modulus of Elasticity of said first deformable region and said second deformable region is in the range of approximately 200,000 psi to 30,000,000 psi.

11. A control cable adjustment device according to claim 1, wherein said rotatably mounted adjuster is adapted to provide a first resistance force when said adjuster is rotated in a first direction and adapted to provide a second resistance force when said adjuster is rotated in a second direction.

12. A control cable adjustment device according to claim 11, wherein said second resistance force is greater than said first resistance force.

13. A control cable adjustment device according to claim 11, wherein said first resistance force and said second resistance force are substantially equal.

14. A control cable adjustment device according to claim 1, wherein said adjuster includes an inner surface, said inner surface including a first threaded portion.

15. A control cable adjustment device according to claim 14, wherein said mounting member outer surface includes a second threaded portion, said second threaded portion being adapted to rotatably engage said adjuster first threaded portion whereby said adjuster is axially movable relative to said mounting member in response to rotation of said adjuster.

16. A control cable adjustment device according to claim 15, wherein said adjuster further includes a protector portion adapted to cooperate with and encase said second threaded portion and said indexing portion.

17. In a control cable system having a control wire operatively connected to a control mechanism and an operating mechanism, said control cable including a cable sheath encasing a portion of said control wire, said adjustment device comprising:

an elongated mounting member having an outer surface and a first cable lumen adapted to receive the control wire therethrough;

an adjuster having a bore defining an inner surface, said adjuster adapted to cooperatively mount said mounting member whereby said adjuster is axially movable relative to said mounting member in response to displacement of said adjuster, said adjuster including a second cable lumen adapted to receive the control wire therethrough and a sheath seat adapted to position one end of the cable sheath; and an indexing mechanism including at least one protrusion formed on a first one of said adjuster inner surface and said mounting member outer surface, and at least one detent formed on a second one of said adjuster inner surface and said mounting member outer surface, said protrusions adapted to engage and disengage said detents in response to displacement of said adjuster, said protrusions and said detented surface adapted to elastically deform during said engagement and disengagement.

18. A control cable adjustment device according to claim 17, wherein said protrusions are adapted to rotatably engage and disengage said detents in response to rotation of said adjuster.

19. A control cable adjustment device according to claim 17, wherein a first of said protrusions and said detented surface are adapted to elastically deform during said engagement and disengagement.

20. A control cable adjustment device according to claim 17, wherein a second of said protrusions and said detented surface are adapted to elastically deform during said engagement and disengagement.

21. A control cable adjustment device according to claim 17, wherein said adjuster inner surface includes a first threaded portion and said mounting member outer surface includes a second threaded portion, said second threaded portion being adapted to rotatably cooperate with said adjuster first threaded portion whereby said adjuster is axially movable relative to said mounting member in response to manual rotation of said adjuster.

22. A control cable adjustment device according to claim 21, wherein said adjuster is adapted to substantially encase said mounting member second threaded portion and said engaging protrusions and detents for the axial range of motion of said adjuster along said mounting member.

23. A control cable adjustment device according to claim 21, wherein said adjuster includes a fibbed outer surface.

24. A control cable adjustment device according to claim 17, wherein said engaging protrusions and detents are adapted to provide a substantially uniform first resistance to rotation of said adjuster in a first direction, and a substantially uniform second resistance to rotation of said adjuster in a second direction.

25. A control cable adjustment device according to claim 24, wherein said second resistance is greater than said first resistance.

26. A control cable adjustment device according to claim 24, wherein said first resistance and said second resistance are substantially equal.

27. A control cable adjustment device according to claim 17, wherein said engaging protrusions and detents are adapted to provide a first variable resistance to rotation of said adjuster in a first direction, and a second variable resistance to rotation of said adjuster in a second direction.

28. A control cable adjustment device according to claim 27, wherein said second variable resistance is greater than said first variable resistance.

29. A control cable adjustment device according to claim 27, wherein said first variable resistance and said second variable resistance are substantially equal.

30. A control cable adjustment device according to claim 17, wherein said first cable lumen includes a first cable slot and said second cable lumen includes a second cable slot.

31. A control cable adjustment device according to claim 17, wherein said adjuster and said mounting member are formed from thermoplastic material.

* * * * *

UNITED STATES PATENT AND TRADEMARK OFFICE
CERTIFICATE OF CORRECTION

PATENT NO. : 5,674,142
DATED : October 7, 1997
INVENTOR(S) : Brian T. Jordan It is certified that error appears in the above-identified patent and that said Letters Patent is hereby corrected as shown below:

In Column 1, line 16, after "two" delete "varieties;" and insert therefore --varieties:--

In Column 4, line 49, after "plurality" insert --of--.

In Column 4, line 67, after "4," insert --respectively,--.

In Column 5, line 25, after "41" insert --a--.

In Column 5, line 26, after "surface" delete "5" and insert therefore --33--.

In Column 5, line 65, after "angle" delete "𝛾" and insert therefore --α--.

In Column 6, line 33, after "plurality" insert --of--.

Signed and Sealed this

Twenty-third Day of June, 1998

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,674,142

DATED : October 7, 1997

INVENTOR(S) : Brian T. Jordan

Figure 1:
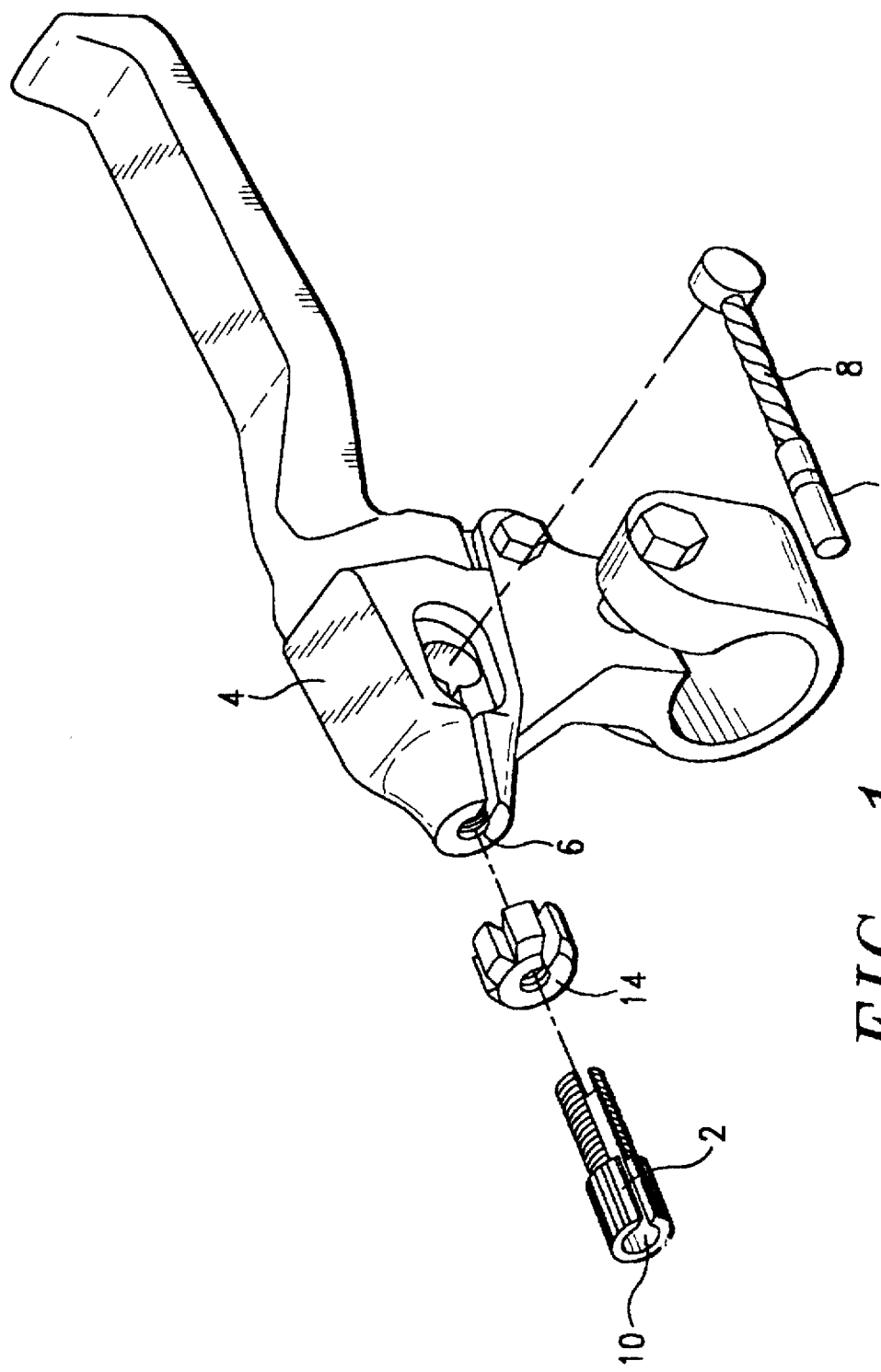
FIG. 1 is an expanded isometric view of a prior art control cable adjustment device.
Figure 2:
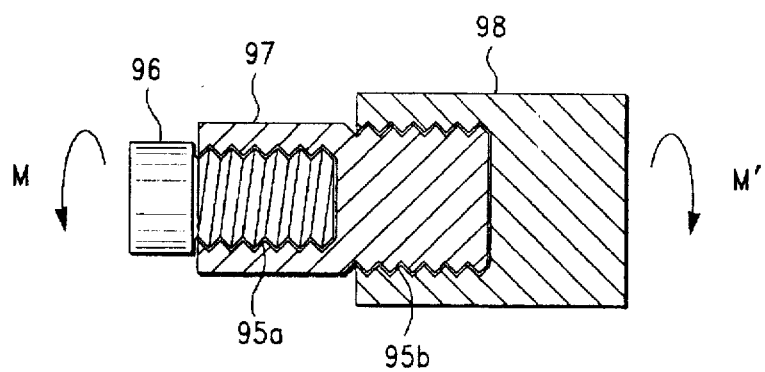
FIG. 2 is a sectional view of an assembly comprising an adjuster screw, an adjuster nut and a mounting element.

It is certified that error appears in the above-identified patent and that said Letters Patent is hereby corrected as shown below:

In the drawings, Sheet 2, Fig. 2, "Ovalized" moment arrows representing moments M, M' should be replaced with "semicircular" moment arrows, as shown below:

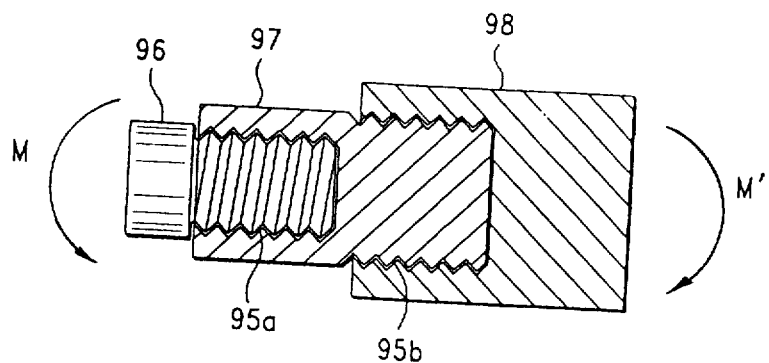

FIG.-2

UNITED STATES PATENT AND TRADEMARK OFFICE
CERTIFICATE OF CORRECTION

PATENT NO. : 5,674,142
DATED : October 7, 1997
INVENTOR(S) : Brian T. Jordan

Figure 3:
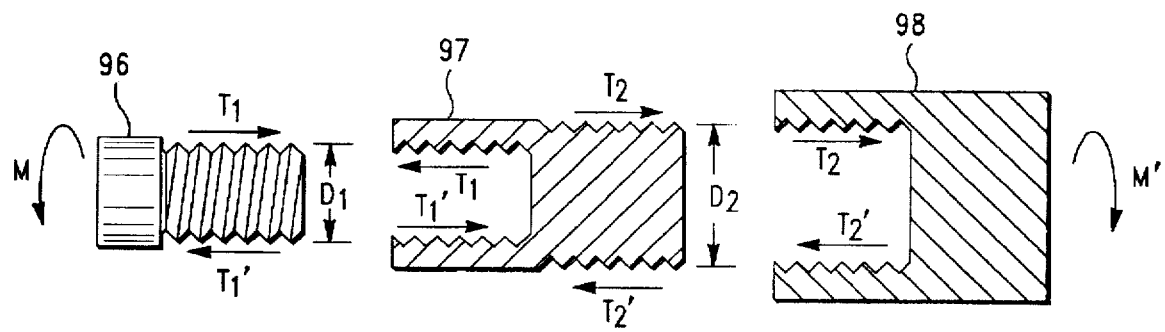
FIG. 3 is an expanded sectional view of the elements illustrated in FIG. 2.

It is certified that error appears in the above-identified patent and that said Letters Patent is hereby corrected as shown below:

In the drawings, Sheet 2, Fig. 3, "Ovalized" moment arrows representing moments M, M' should be replaced with "semicircular" moment arrows and direction of thread forces T2 and T2' as shown on member 98 should be reversed, as shown below:

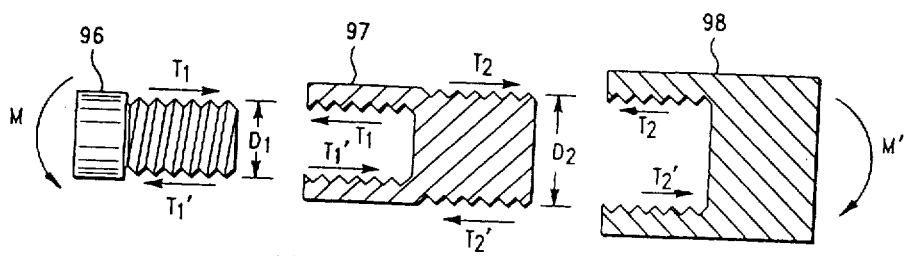

$$T_1 = T_1' = \frac{M}{D_1} \qquad T_2 = T_2' = \frac{M'}{D_2}$$

$$M = T_1 D_1 \qquad\qquad M' = T_2 D_2$$

$$M = M'$$

$$T_1 D_1 = T_2 D_2$$

$$T_2 = T_1 \left(\frac{D_1}{D_2}\right)$$

*FIG.—3*

UNITED STATES PATENT AND TRADEMARK OFFICE
CERTIFICATE OF CORRECTION

PATENT NO. : 5,674,142
DATED : October 7, 1997
INVENTOR(S) : Brian T. Jordan Page 4 of 7

It is certified that error appears in the above-identified patent and that said Letters Patent is hereby corrected as shown below:

In the drawings, Sheet 3, Fig. 4, mounting member reference "A" on twistshifter 20 should be reference number "4" and reference number "8" should be applied to control wire, as shown below:

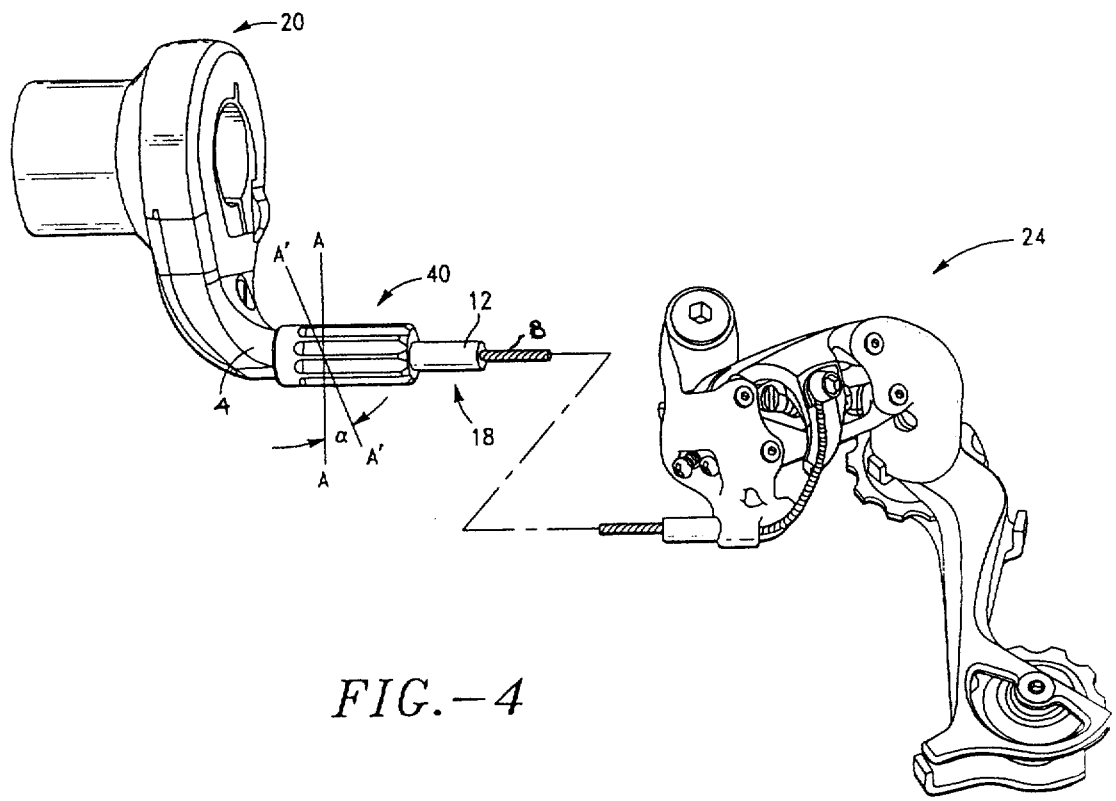

FIG.-4

UNITED STATES PATENT AND TRADEMARK OFFICE
CERTIFICATE OF CORRECTION

PATENT NO. : 5,674,142
DATED : October 7, 1997
INVENTOR(S) : Brian T. Jordan It is certified that error appears in the above-identified patent and that said Letters Patent is hereby corrected as shown below:

In the drawings, Sheet 4, Fig. 5, reference number "40" (adjuster nut) leader line should be replaced with an arrow, as shown below:

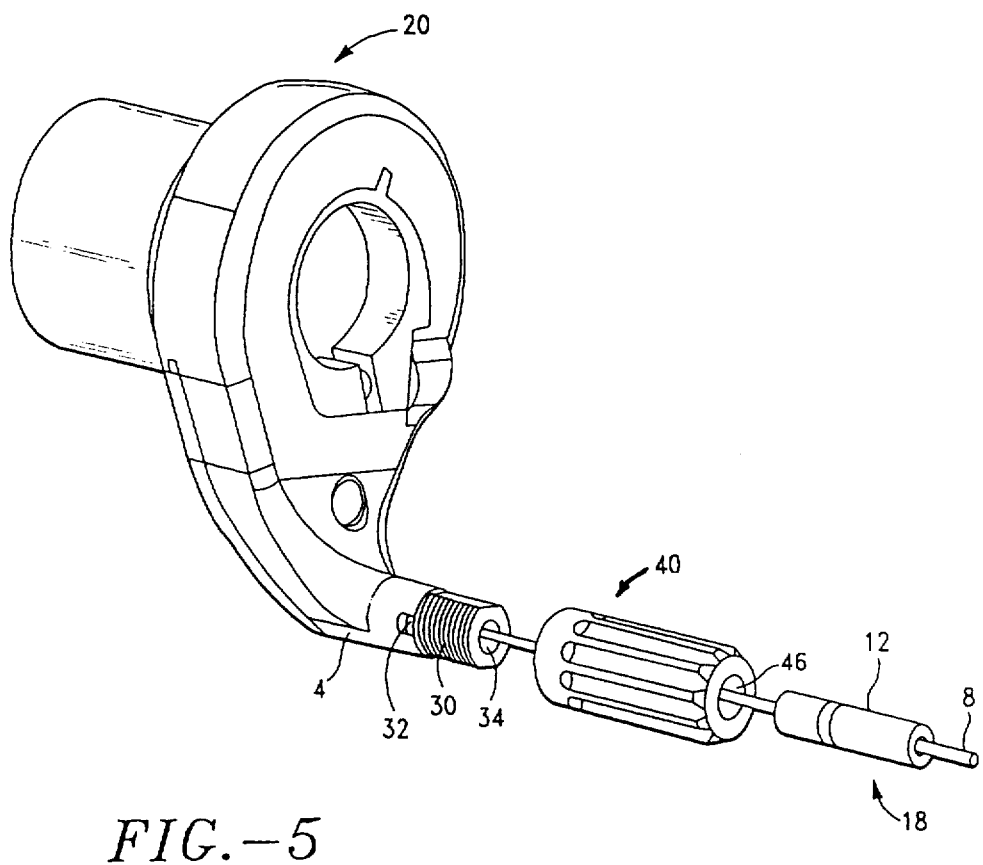

FIG.-5

UNITED STATES PATENT AND TRADEMARK OFFICE
CERTIFICATE OF CORRECTION

PATENT NO. : 5,674,142
DATED : October 7, 1997
INVENTOR(S) : Brian T. Jordan

It is certified that error appears in the above-identified patent and that said Letters Patent is hereby corrected as shown below:

In the drawings, Sheet 7, Fig. 8, reference number "41a" should be applied to adjuster outer surface, as shown below:

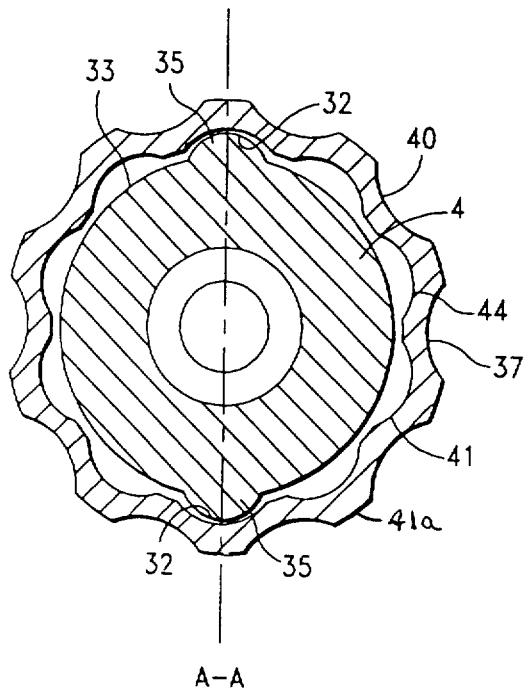

A-A

*FIG.-8*

UNITED STATES PATENT AND TRADEMARK OFFICE
CERTIFICATE OF CORRECTION

PATENT NO. : 5,674,142
DATED : October 7, 1997
INVENTOR(S) : Brian T. Jordan It is certified that error appears in the above-identified patent and that said Letters Patent is hereby corrected as shown below:

In the drawings, Sheet 7, Figs. 8a, 8b, reference number "32" should be deleted, as shown below:

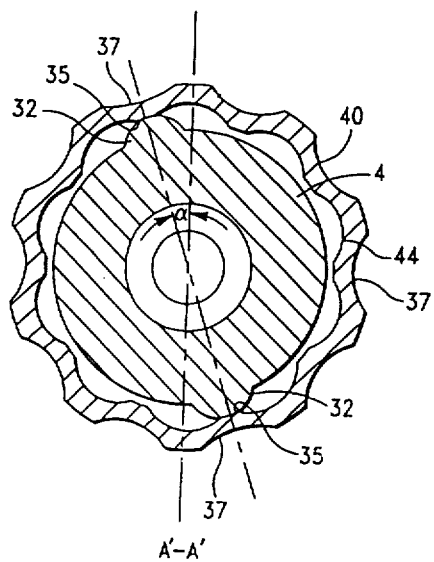
FIG.-8a

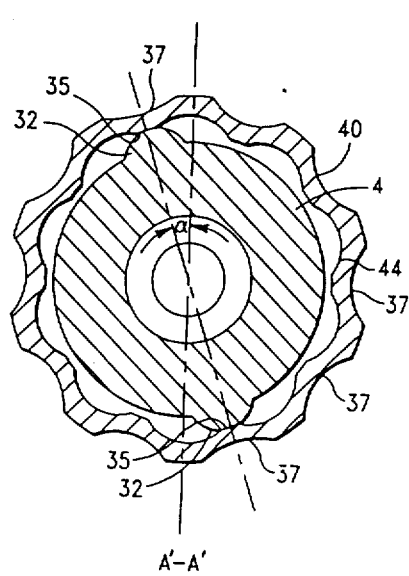
FIG.-8b